July 23, 1968    T. A. SCHETININ    3,394,278
NON-CONTACT INDUCTION CLUTCH

Filed Dec. 1, 1966    2 Sheets-Sheet 1

3,394,278
NON-CONTACT INDUCTION CLUTCH
Timofei Alexeevich Schetinin, ulitsa Plekhanovskaya 6, kv. 151, Voronezh, U.S.S.R.
Filed Dec. 1, 1966, Ser. No. 598,405
3 Claims. (Cl. 310—105)

ABSTRACT OF THE DISCLOSURE

A non-contact induction clutch has a magnetic case with stator teeth in the mid-portion between two excitation windings, a rotor with a toothed core common to both windings, and a rotary armature between the stator and rotor with a non-magnetic belt located between the excitation windings, to function as a clutch or a brake.

---

The present invention relates to non-contact induction clutches intended for transmitting rotation from the drive to the operating mechanism and for controlling the speed of rotation of the latter irrespective of the speed of rotation of the drive.

Non-contact induction clutches are known with two stationary annular excitation windings disposed on the magnetic core of the stator which is made three-legged in section, the magnetic flux of said windings passing through the hollow cylindrical ferromagnetic armature with two magnetically non-conductive annular belts and closing along a rotating toothed core connected with the driving or driven shaft.

Such clutches are able to provide a wide range of control of the speed of rotation only when operating under loads and in case of there being an automatic excitation control system. Such clutches, however, cannot provide braking or stoppage of the working mechanism.

Also known are induction brakes with a stationary magnetic system and a massive ferromagnetic armature adapted for braking and stopping working mechanism.

The hitherto known induction clutches and brakes, however, when used in the same installation, have separate magnetic systems with separate excitation windings and are, in fact, two separate electric machines. It is an object of the present invention to eliminate the above disadvantages.

The specific object of the present invention is to provide a non-contact induction clutch which will be capable with one magnetic system employed to create both a torque and a braking moment, i.e., to operate both as a clutch and a brake.

Said specific object is attained by the fact that in the proposed non-contact induction clutch in the mid-portion of the magnetic core of the stator, teeth are provided for creating a braking moment and the rotary toothed core is made common for the magnetic fluxes of both excitation windings, the non-magnetic annular belt on the armature being located between the excitation windings.

Besides, the non-magnetic annular belt disposed on the armature between the excitation windings is located either opposite the mid-portion of the stator and core teeth, or at an angle to the armature generatrix so that the internal portion of the non-magnetic annular belt is above the mid-portion of the armature teeth and the external portion thereof below one of the excitation windings.

Given below is a description of exemplary embodiments of the invention to be had in conjunction with the accompanying drawings, in which.

Figure 1:
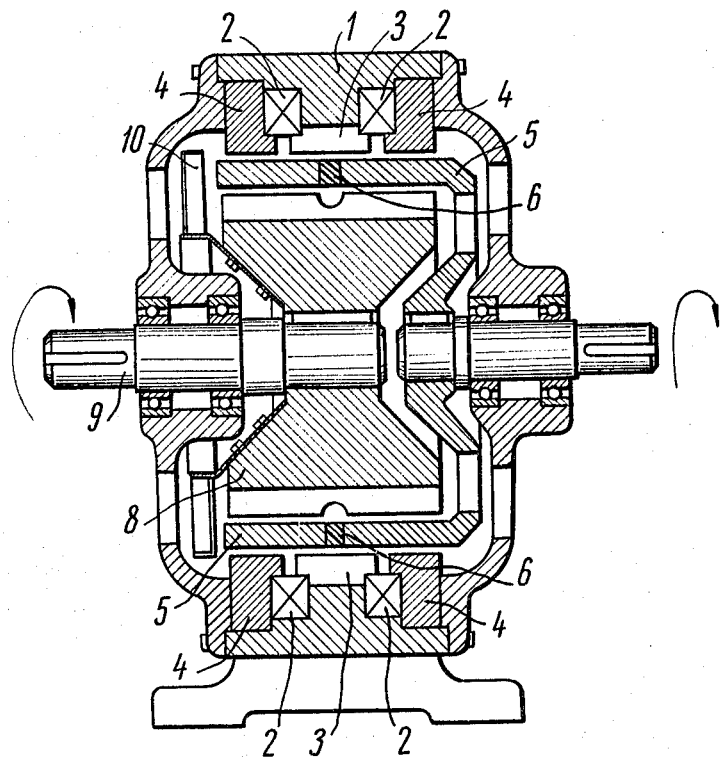
FIG. 1 is a longitudinal section of the clutch with a symmetrical arrangement of the magnetic core of the stator.

As shown in FIG. 1, on the stationary annular magnetic core of the stator 1 two annular excitation windings 2 are disposed fed with direct current. The mid-portion of the magnetic core of the stator 1 disposed between the excitation windings 2 is provided with teeth 3 in the air gap, said teeth functioning as brake poles. The extreme rings 4 of the stator 1 have no teeth.

Armature 5 of the clutch serving as a driven member is constituted by two ferromagnetic parts connected by means of non-magnetic belt 6 disposed between the excitation windings 2 and serving for magnetic insulation of the ferromagnetic parts of the armature 5 from each other. The armature 5 is fixed on driven shaft 7. Rotary core 8 is made common for the fluxes of both excitation windings 2, has teeth which function as poles of the clutch and is fixed on driving shaft 9. Vane 10 fixed to the core 8 serves for axial ventilation of the clutch. The annular belt 6 is disposed opposite the mid-portion of the teeth 3 of the stator 1 and core 8.

Figure 2:
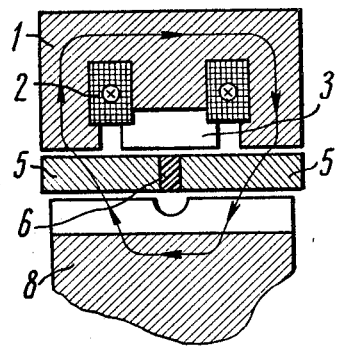
FIG. 2 shows the magnetic flux of the clutch when it functions as a clutch with the symmetrical arrangement of the magnetic core of the stator.

In case of accordant connection of the excitation windings 2 and equal value of current therein the common magnetic flux is directed as shown in FIG. 2 in a dotted line with arrows. In the central toothed portion of the stator 1 there is no magnetic flux since oppositely directed magnetizing forces of the excitation windings 2 on this portion cancel each other. To reduce branching of the main flux through the teeth 3 of the stator 1 the air gap in the central toothed portion of the stator 1 is made greater than other air gaps.

The non-magnetic annular belt 6 on the armature 5 preventing the closing of the flux along the armature 5, the flux passes over to the core 8. The latter rotating, there arise eddy currents in the armature 5, which interact with the flux and cause the armature 5 to rotate.

Figure 3:
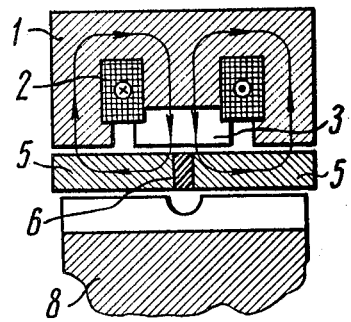
FIG. 3 shows the same when the clutch functions as a brake.

If the polarity on one of the excitation windings is reversed and the value of currents in the windings 2 is the same, the distribution of magnetic fluxes is such as shown in FIG. 3. In this case said fluxes pass through the teeth 3 of the stator 1 and close on the armature 5. Since in this case currents in the armature 5 interact with the flux of the stationary system of the teeth 3 of the stator 1, there arises a braking moment causing the armature 5 to stop.

If the currents in the excitation windings 2 are not equal, there exist a torque and a braking moment simultaneously, which makes it possible to effect deep and stable speed control without recourse to automatic excitation control.

Figure 4:
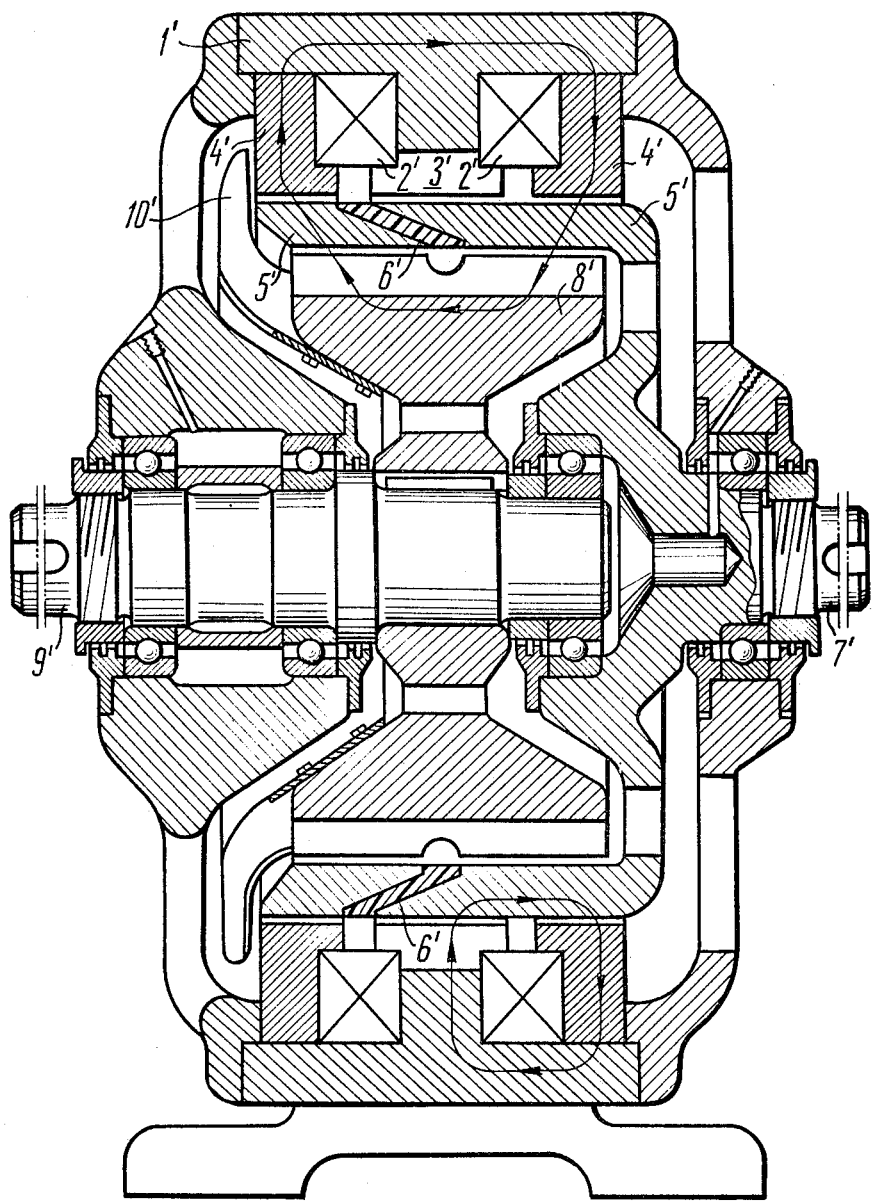
FIG. 4 shows a longitudinal section of the clutch with a non-symmetrical arrangement of the magnetic core of the stator.

Presented in FIG. 4 is an embodiment of a non-symmetric clutch in which non-magnetic annular belt 6' separating ferromagnetic parts of the armature 5' is made as a cone and disposed at an angle to the generatrix of the armature 5'. The internal diameter of said armature is above the mid-portion of the teeth of core 8' and the external diameter thereof is below the middle of one of excitation windings 2'. The direction of the magnetic flux when the clutch operates as a clutch is shown with arrows in the upper portion of the drawing. The currents in the excitation windings 2' are directed similarly but are not equal in value. The relation of magnetizing forces should be such that the flux through the teeth 3' of stator 1' be equal to zero. Also shown in FIG. 4 are rings 4' of the stator 1', driven shaft 7', driving shaft 9' and vane 10'.

In the bottom portion of the drawing (FIG. 4) the direction of the magnetic flux when the clutch operates as a brake is shown by means of arrows. The main magnetic flux is created by one excitation winding 2' and the second excitation winding 2 compensates the leakage flux which could otherwise be branching through the teeth of the core 8' of the clutch.

At various relations between the currents in the excitation windings 2' simultaneous existence of the torque and braking moment is also possible, which fact ensures deep and stable speed control without automatic excitation control.

Both in the first and second embodiments of the clutch (FIGS. 1 and 4 respectively) an inverse arrangement of the magnetic core of the stator and the toothed core is possible, i.e., the magnetic core of the stator may be disposed inside the armature, and the toothed core, being made hollow, may be disposed outside the armature. In all cases the armature is located between the stator and the toothed core.

What is claimed is:

1. A non-contact induction clutch, comprising a stator having stationary annular branching magnetic core with a three-legged in section; two stationary annular excitation windings disposed in said magnetic core of the stator; teeth disposed on the central section of said magnetic core of the stator between said excitation windings, said teeth serving as poles for braking; a toothed core connected with a driving shaft of said clutch and being common for both said excitation windings; an armature disposed between said magnetic core of the stator and said toothed core, said armature connected with a driven shaft of the clutch and composed of two ferromagnetic hollow cylinders; a non-magnetic annular belt located on the armature between said excitation windings and connecting said ferromagnetic hollow cylinders.

2. An non-contact induction clutch as defined in claim 1, which said annular belt located on said armature on the portion thereof between said excitation windings is disposed opposite the mid-portion of the teeth of said stator and said magnetic. core.

3. A non-contact induction clutch as set forth in claim 1, wherein said annular belt located on said armature on the portion thereof between said excitation windings is disposed at an angle to the generatrix of said armature so, that its internal portion is above the middle of the teeth of said magnetic core and the external portion thereof is below one of said excitation windings.

References Cited
UNITED STATES PATENTS

| | | | |
|---|---|---|---|
| 2,408,080 | 9/1946 | Lloyd | 310—102 |
| 2,752,800 | 7/1956 | Raymond et al. | 310—92 |
| 2,906,900 | 9/1959 | Cohen et al. | 310—101 |
| 3,174,064 | 3/1965 | Muller | 310—103 |
| 3,176,175 | 3/1965 | Jaeschke | 310—105 |

ROBERT K. SCHAEFER, *Primary Examiner.*

H. O. JONES, *Assistant Examiner.*